(12) United States Patent
Mahalingam et al.

(10) Patent No.: US 8,765,275 B2
(45) Date of Patent: Jul. 1, 2014

(54) ENERGY STORAGE DEVICE AND ASSOCIATED METHOD

(75) Inventors: Sakethraman Mahalingam, Bangalore (IN); Lembit Salasoo, Schenectady, NY (US); Kenneth Walter Browall, Saratoga Springs, NY (US); Ajit Wasant Kane, Erie, PA (US); Ashalatha Devarajan, Bangalore (IN)

(73) Assignee: General Electric Company, Niskayuna, NY (US)

( * ) Notice: Subject to any disclaimer, the term of this patent is extended or adjusted under 35 U.S.C. 154(b) by 1183 days.

(21) Appl. No.: 12/246,518

(22) Filed: Oct. 7, 2008

(65) Prior Publication Data
US 2010/0086834 A1 Apr. 8, 2010

(51) Int. Cl.
*H01M 2/38* (2006.01)
*H01M 2/14* (2006.01)

(52) U.S. Cl.
USPC ............................................ 429/51; 429/131

(58) Field of Classification Search
None
See application file for complete search history.

(56) References Cited

U.S. PATENT DOCUMENTS

| 3,468,709 A | 9/1969 | Kummer |
| 4,997,732 A | 3/1991 | Austin et al. |
| 5,380,596 A | 1/1995 | Yoshida et al. |
| 2007/0243437 A1* | 10/2007 | Katano ........................... 429/25 |
| 2008/0145749 A1* | 6/2008 | Iacovangelo et al. ......... 429/130 |

FOREIGN PATENT DOCUMENTS

| JP | 21223019 A2 | 8/2001 |
| JP | 2001223019 A * | 8/2001 |
| WO | WO9211663 A1 | 7/1992 |

OTHER PUBLICATIONS

David Trickett, Current Status of Health and Safety Issues of Sodium/Metal Chloride (Zebra) Batteries, Nov. 1998, National Renewable Energy Laboratory, National Technical Information Service (NTIS), Department of Commerce.*

* cited by examiner

*Primary Examiner* — Ula C Ruddock
*Assistant Examiner* — Daniel Gatewood
(74) *Attorney, Agent, or Firm* — Francis T. Coppa

(57) ABSTRACT

An energy storage device is provided that includes a separator having a first surface and a second surface. The first surface defines at least a portion of a cathodic chamber, and the second surface defines an anodic chamber. The cathodic chamber includes an alkali metal halide that forms an ion that is capable of conducting through the separator. The anodic chamber has a volume that is filled with a consumable fluid. The amount of the consumable fluid is greater than 90 percent by volume of the anodic chamber volume. Furthermore, the consumable fluid is reactive with an ionic species of the alkali metal halide. A method of sealing the energy storage device is also provided.

5 Claims, No Drawings

ENERGY STORAGE DEVICE AND ASSOCIATED METHOD

BACKGROUND

1. Technical Field

The invention includes embodiments that relate to a seal for an energy storage device. The invention includes embodiments that relate to a method of sealing an electrochemical cell.

2. Discussion of Related Art

Development work has been undertaken on high temperature rechargeable batteries/cells using sodium for the negative electrodes. The liquid sodium anode is separated from a cathode by a sodium-ion conducting solid electrolyte and sealed from each other at atmospheric pressure. Suitable material for solid electrolyte includes beta alumina and beta"alumina, known as beta alumina separator electrolyte (BASE). While charging and discharging of the cell, the volumes of the anode and the cathode compartments/chambers change due to the passage of sodium ions through the separator and so the pressure levels in both the electrodes. The change in pressure levels at both side of the separator during charging and discharging reduces the reliability and life of the separator due to fatigue. Also, the ionic transfer may cause a degradation of the separator. This may result in cracking of the separator that may cause cell failure.

It may be desirable to have an energy storage device that differs from those that are currently available. It may be desirable to have a method of sealing an electrochemical cell that differs from those methods that are currently available.

BRIEF DESCRIPTION

In accordance with an embodiment of the invention, an energy storage device is provided. The energy storage device includes a separator having a first surface and a second surface. The first surface defines at least a portion of a cathodic chamber, and the second surface defines an anodic chamber. The cathodic chamber includes an alkali metal halide that forms an ion that is capable of conducting through the separator. The anodic chamber has a volume that is filled with a consumable fluid. The amount of the consumable fluid is greater than 90 percent by volume of the anodic chamber volume. Furthermore, the consumable fluid is reactive with an ionic species of the alkali metal halide.

In accordance with an embodiment of the invention, an energy storage device is provided. The energy storage device includes a separator having a first surface and a second surface. The first surface defines at least a portion of a cathodic chamber, and the second surface defines an anodic chamber. The cathodic chamber includes an alkali metal halide that forms an ion that is capable of conducting through the separator. The anodic chamber has a volume that is filled with oxygen. The amount of oxygen is greater than 90 percent by volume of the anodic chamber volume.

An energy storage device is provided in one embodiment of the invention. The device includes a separator. The separator has a first surface that defines at least a portion of a cathodic chamber, and a second surface that defines an anodic chamber. The cathodic chamber includes an alkali metal halide that forms an ion that is capable of conducting through the separator. At least one of the cathodic chamber or the anodic chamber is sealed under partial vacuum relative to standard pressure. The anodic chamber is filled with a fluid that is greater than 90 percent by weight.

In accordance with an embodiment of the invention, a method of forming (sealing) an energy storage device is provided. The method includes filling an anodic chamber with a consumable fluid. The consumable fluid gets consumed during operation of the device. The method includes charging of the energy storage device and reducing a pressure in the anodic chamber on reaction of the consumable fluid into a fluid or solid physical state.

DETAILED DESCRIPTION

The invention includes embodiments that relate to an energy storage device having a sealed inner chamber. The invention includes embodiments that relate to a method of sealing an electrochemical cell in the energy storage device.

As used herein, cathodic material is the material that supplies electrons during charge and is present as part of a redox reaction. Anodic material accepts electrons during charge and is present as part of the redox reaction. Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

In accordance with an embodiment of the invention, an energy storage device is provided. The energy storage device comprises a separator having a first surface and a second surface. The first surface defines at least a portion of a cathodic chamber, and the second surface defines an anodic chamber. The cathodic chamber comprises an alkali metal halide that forms an ion that is capable of conducting through the separator. The anodic chamber has a volume that is filled with a consumable fluid. The amount of the consumable fluid is greater than 90 percent by volume of the anodic chamber volume. Furthermore, the consumable fluid is reactive with an ionic species of the alkali metal halide.

The separator is disposed within a housing. The separator may have a cross-sectional profile normal to the axis that is a circle, a triangle, a square, a cross, or a star.

The separator is an alkali metal ion conductor solid electrolyte that conducts alkali metal ions during use. Suitable materials for the separators may include an alkali-metal-beta'-alumina, alkali-metal-beta"-alumina, alkali-metal-beta'-gallate, or alkali-metal-beta"-gallate. In one embodiment, the separator includes a beta alumina. In one embodiment, a portion of the separator is alpha alumina and another portion of the separator is beta alumina. The alpha alumina may be relatively more amenable to bonding (e.g., compression bonding) than beta alumina, and may help with sealing and/or fabrication of the energy storage device.

The separator may be stabilized by the addition of small amounts of, but not limited to lithia, magnesia, zinc oxide, yttria or similar oxides. These stabilizers may be used alone or in combination with themselves or with other materials. The separator, sometimes referred to as beta alumina separator electrolyte (BASE) may include one or more dopant. Suitable dopants may include oxide of a transition metal selected from iron, nickel, copper, chromium, manganese, cobalt, or molybdenum. A separator having the dopants is referred to as beta"alumina separator electrolyte, and has higher sodium ion conductivity than beta alumina. Sodium ion conductivity of one form of beta"alumina separator electrolyte at 300 degrees Celsius is in a range of from about 0.2 ohm-1 cm-1 to about 0.4 ohm-1 cm-1.

The amount of the stabilizer to the beta"alumina can be greater than 0.5 weight percent. In one embodiment, the amount is in a range of from about 0.5 weight percent to about 1 weight percent, from about 1 weight percent to about 2 weight percent, from about 2 weight percent to about 3 weight percent, from about 3 weight percent to about 4 weight percent, from about 4 weight percent to about 5 weight percent, from about 5 weight percent to about 10 weight percent, from about 10 weight percent to about 15 weight percent, from about 15 weight percent to about 20 weight percent, or greater than about 20 weight percent based on the total weight of the beta"alumina material.

The separator can be a tubular container in one embodiment having at least one wall. The wall can have a thickness; and an ionic conductivity and the resistance across the wall may depend in part on the thickness. Suitable thickness can be less than 5 millimeters. In one embodiment, the thickness is in a range of from about 5 millimeters to about 4 millimeters, from about 4 millimeters to about 3 millimeters, from about 3 millimeters to about 2 millimeters, from about 2 millimeters to about 1.5 millimeters, from about 1.5 millimeters to about 1.25 millimeters, from about 1.25 millimeters to about 1.1 millimeters, from about 1.1 millimeters to about 1 millimeter, from about 1 millimeter to about 0.75 millimeters, from about 0.75 millimeters to about 0.6 millimeters, from about 0.6 millimeters to about 0.5 millimeters, from about 0.5 millimeters to about 0.4 millimeters, from about 0.4 millimeters to about 0.3 millimeters, or less than about 0.3 millimeters.

A cation facilitator material can be disposed on at least one surface of the separator, in one embodiment. The cation facilitator material may include, for example, selenium. At least one separator surface has a surface roughness RMS in a range of greater than about 10 nanometers. In one embodiment, the surface roughness RMS is in range of from about 10 nanometers to about 20 nanometers, from about 20 nanometers to about 30 nanometers, from about 30 nanometers to about 40 nanometers, from about 40 nanometers to about 50 nanometers, from about 50 nanometers to about 60 nanometers, from about 60 nanometers to about 70 nanometers, from about 70 nanometers to about 80 nanometers, from about 80 nanometers to about 90 nanometers, from about 90 nanometers to about 100 nanometers. In another embodiment, an alkali metal ion wicking material may abut the surface of the separator.

Optionally, one or more shim structures can be disposed with the volume. The shim structures support the separator within the volume of the housing. The shim structures can protect the separator from vibrations caused by motion of the cell during use and thus reduce or eliminate movement of the separator relative to the housing. If present, the shim structures may function as a current collector to the housing. Utilization of the shim structures as a current collector may be useful if the molten anode level rises and falls during charge and discharge. The shim structures may provide a thin gap adjacent to the separator to facilitate wicking of a thin layer of molten anodic material against a surface of the separator. This wicking may be independent of the state of charge of the battery, and independent of the head height of anodic material.

The separator may have a first surface and a second surface. The first surface may define a portion of a cathodic chamber and the second surface may define an anodic chamber. The two chambers may be in ionic communication with each other through the separator.

The cathodic chamber may contain a cathodic material. The cathodic material may exist in elemental form or as a salt depending on a state of charge. That is, the cathodic material presents in elemental form and/or salt form and the ratio of the weight percent of the cathodic material in elemental form to the weight percent of the salt form may be based on the state of charge. The cathodic material may contain an alkali metal and the salt form of the cathodic material may be a halide. Suitable materials for use as the cathodic material may include aluminum, nickel, zinc, copper, chromium, tin, arsenic, tungsten, molybdenum, and iron. In one embodiment, the cathodic material may include two or more of metals selected from aluminum, nickel, zinc, copper, chromium, tin, arsenic, tungsten, molybdenum, and iron. The halide of the alkali metal may include chlorine, fluorine and iodine.

In one embodiment, the cathodic material may contain two of cathodic materials, a first cathodic material and a second cathodic material. The first cathodic material may include aluminum, nickel, zinc, copper, chromium, and iron. The second cathodic material is different from the first cathodic material and may include aluminum, nickel, zinc, copper, chromium, and iron. Other suitable second cathodic material may include tin and/or arsenic. Other suitable second cathodic materials may include tungsten, titanium, niobium, molybdenum, tantalum, and vanadium. The first cathodic material may be present relative to the second metals by a ratio in that is less than about 100:1. In one embodiment, the first cathodic material may be present relative to the additive metals by a ratio that is in a range from about 100:1 to about 50:1, from about 50:1 to about 1:1, or from about 1:1 to about 1:50, from about 1:50 to about 1:95.

The cathodic material can be self-supporting or liquid/molten, but in one embodiment the cathodic material is disposed on an electronically conductive support structure. The support structure may be a foam, a mesh, a weave, a felt, or a plurality of packed particles, fibers, whiskers. In one embodiment, a suitable support structure may be formed from carbon. A suitable carbon form is reticulated foam. A support structure may be formed from a metal.

The cathodic material can be secured to an outer surface of the support structure. The support structure can have a high surface area. The cathodic material on the support structure may be adjacent to the first surface of the separator and extend away from that separator surface. The support structure can extend away from the first surface to a thickness that is greater than about 0.01 millimeters. In one embodiment, the thickness is in a range of from about 0.01 millimeters to about 0.1 millimeter, from about 0.1 millimeters to about 1 millimeter, from about 1 millimeter to about 5 millimeters, from about 5 millimeters to about 10 millimeters, from about 10 millimeters to about 15 millimeters, from about 15 millimeters to about 20 millimeters. For larger capacity electrochemical cell, the thickness may be larger than 20 millimeters.

A sulfur or a phosphorous-containing additive may be disposed in the cathodic material. The presence of sulfur or phosphorous in the cathode may reduce or prevent recrystallization of salts and grain growth. For example, elemental sulfur, sodium sulfide or triphenyl sulfide may be disposed in the cathode.

The ionic material transported across the separator between the anodic chamber and the cathodic chamber is an alkali metal in one embodiment. Suitable ionic material may include one or more of sodium, lithium and potassium. The anodic chamber may receive and store a reservoir of an anodic material. The anodic material is molten during use. Additives suitable for use in the anodic material may include a metal oxygen scavenger. Suitable metal oxygen scavengers may include one or more of manganese, vanadium, zirconium, aluminum, or titanium. Other useful additives may include materials that increase wetting of the separator surface by the molten anodic material. Additionally, some additives may enhance the contact or wetting of the separator with regard to the current collector, to ensure substantially uniform current flow throughout the separator.

Other additives may affect performance. Such performance additives may increase ionic conductivity, increase or decrease solubility of the charged cathodic species, reduce vapor pressure over the electrode, improve wetting of the solid electrolyte by the molten electrolyte, or prevent ripening of the cathode microdomains, to name several utilities. In one embodiment, the additive may be present in an amount that is less than about 5 mole percent compared to the total combined moles of alkali metal halide, aluminum halide and zinc halide.

The anodic chamber may further contain a consumable fluid. The amount of the consumable fluid in the anodic chamber volume may be greater than about 90 percent by volume. In one embodiment, the amount of the consumable fluid may be in a range of from about 90 percent by volume to 92 percent by volume, from about 92 percent by volume to 94 percent by volume, from about 94 percent by volume to 96 percent by volume, from about 96 percent by volume to 98 percent by volume. In one embodiment, the amount of the consumable fluid may be greater than about 98 percent by volume. The consumable fluid may be filled in the anodic chamber volume before sealing the anodic chamber, while manufacturing of the device.

The cathodic and the anodic chambers can be sealed to the separator by a sealing structure. A sealing of a device provides (maintains) a seal between the contents of the device and the environment, also, prevents leakage and contamination. Also, the sealing structure isolates the cathodic chamber and the anodic chamber from outside environment and from each other.

The sealing structure can be of a glassy composition, a cermet or a combination thereof. Suitable glassy sealing compositions may include, but are not limited to phosphates, silicates, borates, germinates, vanadates, zirconates, arsenates, and their various forms, for example, borosilicates, alumino silicate, calcium silicate, binary alkali silicates, alkali borates, or a combination of two or more thereof. The cermet may contain alumina and a refractory metal. Suitable refractory metal may include one or more of molybdenum, rhenium, tantalum or tungsten. Alternatively, the end portions of the separator may include alpha alumina. The alpha alumina can be bonded directly to the lid that encloses the second chamber. Suitable bonding methods may include thermal compression bonding, diffusion bonding, or thin film metallizing, each of these may be used in conjunction with welding or brazing techniques.

The sealing structure is operable to maintain a seal between the contents and the environment at a temperature range. Each of the cathodic chamber and the anodic chamber is sealed at a temperature greater than about 100 degrees Celsius. In one embodiment, the operating temperature range is from about 100 degrees Celsius to about 200 degrees Celsius, from about 200 degrees Celsius to about 300 degrees Celsius, from about 300 degrees Celsius to 400 degrees Celsius, from about 400 degrees Celsius to about 500 degrees Celsius, from about 500 degrees Celsius to about 600 degrees Celsius. The separator may not etch or pit in the presence of a halogen and the anodic material.

The sealing structure maintains pressure levels within the cathodic chamber and the anodic chamber when sealed at standard atmospheric pressure. The pressure levels depend on the air columns above the cathodic material and the anodic material in the chambers. The volumes of the air columns change on transport of alkali metal ions through the separator during charging and discharging of the electrochemical cell. This results in the compression or expansion of the air columns in the anodic chamber and the cathodic chamber. These changes in the air columns cause change of pressure levels on both side of the separator that affects the strength of the separator and reduces its reliability.

The cathodic chamber and the anodic chamber may be sealed under partial vacuum relative to standard pressure. That means the pressure level within the chamber is less than the standard pressure. The standard pressure may be the pressure of the environment outside the device that is atmospheric pressure. A reduction in atmospheric pressure in a closed system may be called a partial vacuum. Vacuum is the pressure differential produced by evacuating air from the system. A vacuum of 1 Torr to $10^{-3}$ Torr can be considered partial vacuum. One Torr, the conventional unit of pressure in vacuum, is the pressure equivalent of a manometer reading of 1 mm of liquid mercury; 1 Torr=$\frac{1}{760}$ atm=$1.333\times10^{-3}$ bar=133.3 Pa.

In one embodiment, one of the cathodic chamber or the anodic chamber is sealed under partial vacuum relative to standard pressure. In another embodiment, the cathodic chamber and the anodic chamber are sealed under partial vacuum relative to standard pressure. In an embodiment, the only the cathodic chamber is sealed under partial vacuum relative to standard pressure. The pressure level inside the chamber that is sealed under partial vacuum may be less than about 1 Torr. In one embodiment, the pressure level inside the chamber that is sealed under partial vacuum may be in a range of from about 1 Torr to about $10^{-1}$ Torr, from about $10^{-1}$ Torr to about $10^{-2}$ Torr, from about $10^{-2}$ Torr to about $10^{-3}$ Torr. In one embodiment, the partial vacuum can be pulled within the chamber by using a vacuum pump.

The pressure level/partial vacuum within the anodic chamber may also depend on the content (by weight) of the consumable fluid filled in the anodic chamber. The content of the consumable fluid filled in the anodic chamber may be greater than 90 percent by weight. In one embodiment, the content of the consumable fluid may be in a range of from about 90 percent by weight to 92 percent by weight, from about 92 percent by weight to 94 percent by weight, from about 94 percent by weight to 96 percent by weight, from about 96 percent by weight to 98 percent by weight. In one embodiment, the content of the consumable fluid may be greater than about 98 percent by weight.

The consumable fluid may be filled in the anodic chamber volume before sealing the anodic chamber, while manufacturing of the cell. The consumable fluid may be reactive with an ionic species of the alkali metal halide. An amount of the consumable fluid may react with the alkali metal and may get consumed during charge of the electrochemical cell. In one embodiment, on reacting with alkali metal, the consumable fluid may be consumed into a fluid. According to another embodiment, the consumable fluid may be consumed into a solid. More and more amount of the consumable fluid may get consumed during charge in subsequent cycles. In one embodiment, the consumable fluid may be a liquid. In another embodiment, the consumable fluid may be a gas. The gas may react with the alkali metal and form a solid. Consumption of the gas into the solid may bring down the pressure level and create partial vacuum within the anodic chamber. In one embodiment, the gas may be oxygen.

Under partial vacuum, the cathodic chamber and the anodic chamber may have less pressure within the chambers compared to the standard pressure, and thus change in pressure levels may be minimal on transport of alkali metal from the cathodic chamber to the anodic chamber and vice-versa. Less is the difference in pressure levels of the cathodic chamber and the anodic chamber, less is differential pressure during operation of the device. Reduction in differential pressure between the chambers provides (leads) less stress on the separator and enhances the reliability of the separator. This results longer life of the separator.

The electrochemical cell may be assembled in the discharged state. Applying a voltage between the anodic chamber and the cathodic chamber of the electrochemical cell and reversing the electrochemical reaction may charge the electrochemical cell. The cell reaction is as follows:

$$2NaCl + \text{cathodic material} \rightarrow (\text{cathodic material})Cl_2 + 2Na$$

During charging, sodium chloride in the cathodic chamber is decomposed by applied electrical potential to form sodium ions and chloride ions. Sodium ions, under the influence of applied electrical potential, conduct through the separator and combine with electrons from the external circuit to form the sodium in the anodic chamber and chloride ions react with the transition metal in first material to form metal chloride and donate electrons back to external circuit. Sodium formed inside the anodic chamber during maiden charge reacts with oxygen within the anodic chamber and forms sodium oxide. Sodium oxide is a solid at cell operating temperature. Thus consumption of oxygen by sodium evacuates the anodic chamber. As all the oxygen is consumed and charging is continued, sodium in liquid form starts to fill inside the anodic chamber. During discharge, sodium ions conduct back through the separator reversing the reaction, and generate electrons.

The embodiments described herein may be examples of compositions, structures, systems, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes compositions, structures, systems and methods that do not differ from the literal language of the claims, and further includes other structures, systems and methods with insubstantial differences from the literal language of the claims. While only certain features and embodiments have been illustrated and described herein, many modifications and changes may occur to one of ordinary skill in the relevant art. The appended claims cover all such modifications and changes.

What is claimed is:

1. A method, comprising;
   filling an anodic chamber in an energy storage device with oxygen as a consumable fluid in an amount greater than about 90 percent by volume;
   filling the cathodic chamber with an alkali metal halide;
   sealing the energy storage device after filling the anodic chamber and the cathodic chamber,
   charging the energy storage device to consume a substantial amount of oxygen by reaction into a fluid or solid physical state; and
   evacuating the anodic chamber by reducing a pressure in the anodic chamber on reaction of oxygen into the fluid or solid physical state.

2. The method as defined in claim 1, further comprising reducing a pressure difference of the anodic chamber across a separator relative to a cathodic chamber by evacuating the anodic chamber on consumption of oxygen.

3. The method as defined in claim 1, wherein charging the energy storage device comprises reacting oxygen with an ionic species of an alkali metal halide.

4. The method as defined in claim 1, wherein sealing is carried out at a temperature from about 100 degrees Celsius to about 600 degrees Celsius.

5. The method as defined in claim 1, wherein sealing the energy storage device comprises sealing the device under partial vacuum.

* * * * *